United States Patent [19]

Hucker

[11] 4,442,396
[45] Apr. 10, 1984

[54] GENERATOR SYSTEM WITH FAULT CONDITION EXCITATION

[75] Inventor: David J. Hucker, Rockford, Ill.

[73] Assignee: Sundstrand Corporation, Rockford, Ill.

[21] Appl. No.: 480,727

[22] Filed: Mar. 31, 1983

[51] Int. Cl.³ ............................ H02P 9/10; H02P 9/14
[52] U.S. Cl. ........................................ 322/21; 322/25; 322/28; 361/21; 361/52
[58] Field of Search ..................................... 322/21–25, 322/28, 37; 361/20, 21, 52

[56] References Cited

U.S. PATENT DOCUMENTS

| | | |
|---|---|---|
| 2,497,141 | 2/1950 | Schultz . |
| 2,857,565 | 10/1958 | Sealey ............................. 322/21 X |
| 3,074,002 | 1/1963 | Potter . |
| 3,189,814 | 6/1965 | Rosenberry et al. . |
| 3,210,644 | 10/1965 | Sparrow . |
| 3,535,589 | 10/1970 | Bourgeault ...................... 361/21 |
| 3,673,488 | 6/1972 | Spiller . |
| 4,015,189 | 3/1977 | Gorden . |
| 4,346,337 | 8/1982 | Watrous ............................ 322/25 |
| 4,400,659 | 8/1983 | Barron et al. .................... 322/25 X |

Primary Examiner—R. J. Hickey
Attorney, Agent, or Firm—Wood, Dalton, Phillips, Mason & Rowe

[57] ABSTRACT

A generator system which is self-excited even during a fault condition includes a main generator having armature windings and a main field winding which is excited by a rotary transformer. The rotary transformer includes a stationary primary winding and a rotating secondary winding, with the primary winding receiving a controlled portion of the main generator armature output. The current through the primary winding of the transformer is controlled by silicon controlled rectifiers which are gated by a voltage regulator circuit. The voltage regulator circuit in turn receives signals from the voltage delivered to the load, the highest phase current delivered to the load and the voltage at the main generator armature output. The voltage regulator controls the current through the primary winding of the transformer in accordance with the voltage delivered to the load if that voltage is greater than a predetermined value. If the voltage delivered to the load is less than the predetermined value, such as when a fault condition arises, the current through the primary winding of the transformer is controlled in accordance with the voltage at the main generator armature output. A current limiter is also provided to limit the output current from the main generator armature during a fault condition to maintain the voltage of the generator armature at acceptable levels for self-excitation.

16 Claims, 13 Drawing Figures

GENERATOR SYSTEM WITH FAULT CONDITION EXCITATION

DESCRIPTION

1. Technical Field

The present invention relates generally to generating systems, and more particularly to a generator system which is self-exciting even under fault conditions.

2. Background Art

Prior generator systems have incorporated pilot exciter rotating rectifier arrangements to allow brushless construction. Control power for the field of the exciter is typically provided by a permanent magnet generator, or PMG, to supply control power that is relatively independent from main generator output power disturbances. Such a system is shown in Gorden U.S. Pat. No. 4,015,189.

While such a system may be advantageous in that relatively low control power is required due to the exciter gain, it has been noted that this system also suffers from severe disadvantages. The generator system requires a relatively long package which affects critical speed and severely restricts available installations in places where space is at a premium, such as aircraft. Further, the generator system has inherently slow control response due to the two cascaded electromagnetic gain stages. Also, the cost of the system is high due to the need for three complete electromagnetic structures.

In order to overcome the above-noted disadvantages, other types of self-exciting generator systems have been devised, such as those shown in Rosenberry et al. U.S. Pat. No. 3,189,814 and Spiller U.S. Pat. No. 3,673,488. The Rosenberry et al. generator system obviates the need for a PMG by feeding power in parallel paths from at least one phase in the generator armature to the exciter field. One of the paths supplies rectified phase voltage to the exciter field while the other path furnishes current from a current transformer associated with the same phase when excitation is needed due to variations in the load.

The generator system disclosed by Spiller dispenses with the need for a conventional PMG by utilizing a voltage regulator which is responsive to the generator output and which gates an SCR circuit to provide exciter field current. In the event of a fault condition at the output of the generator, a series of current transformers feed back a portion of the output of the exciter to the exciter field winding to maintain main field current during the period of the fault condition.

The generator systems disclosed by Rosenberry et al and Spiller require cumbersome power current transformer circuits to excite the generator when the output is short circuited, thereby undesirably increasing the size and weight of the generator package. Further, the generator system disclosed by Spiller requires the use of slip rings and/or brushes which are subject to wear and arcing.

DISCLOSURE OF THE INVENTION

In accordance with the present invention, a generator system includes means for providing excitation of the main generator field even during a fault condition at the load driven thereby. The system of the present invention does not require the use of a conventional PMG, nor does it utilize cumbersome power current transformer circuits or slip rings and/or brushes.

The generator system of the present invention includes a transformer having a stationary primary winding which receives a controlled portion of the alternating current developed by main generator armature windings. The rotating transformer also includes a rotating secondary winding which develops excitation current for a main generator field winding. The transformer primary winding receives current from the main generator armature output and is controlled either by the voltage delivered to the load or by the voltage at the armature output depending upon whether the voltage delivered to the load is above or below a predetermined value. If the voltage delivered to the load is above the predetermined value, indicating that no fault condition exists, then the current delivered to the primary of the transformer is controlled in accordance with the average voltage and the highest phase current delivered to the load. If the voltage delivered to the load is below a predetermined value, indicating that a fault has arisen, then the current through the transformer primary is controlled in accordance with the voltage at the output of the main generator armature.

Also provided is means to limit the output current from the main armature, with the limiting means being in the form of silicon controlled rectifiers which are "phased back" in the event of a fault so that the voltage at the output of the main generator armature can be maintained at a sufficiently high value to permit continued self-excitation.

In a first embodiment of the invention, a pair of parallel connected silicon controlled rectifiers, or SCR's, are connected in series with the primary of the transformer and are controlled by a voltage regulator which fires the SCR's at proper phase angle to provide proper excitation for the main field winding.

In a further embodiment of the invention, the current through the primary of the transformer is controlled by means of a controlled inverter which allows free choice of the frequency used for excitation, rather than being limited to the alternator output frequency. This in turn allows the size and weight of the rotating transformer to be reduced.

The concepts of the present invention can be adapted for use in various types of generator systems, such as a DC link system and a cyclo-converter system.

BEST MODE FOR CARRYING OUT THE INVENTION

Figures 1, 2, 4, 5:
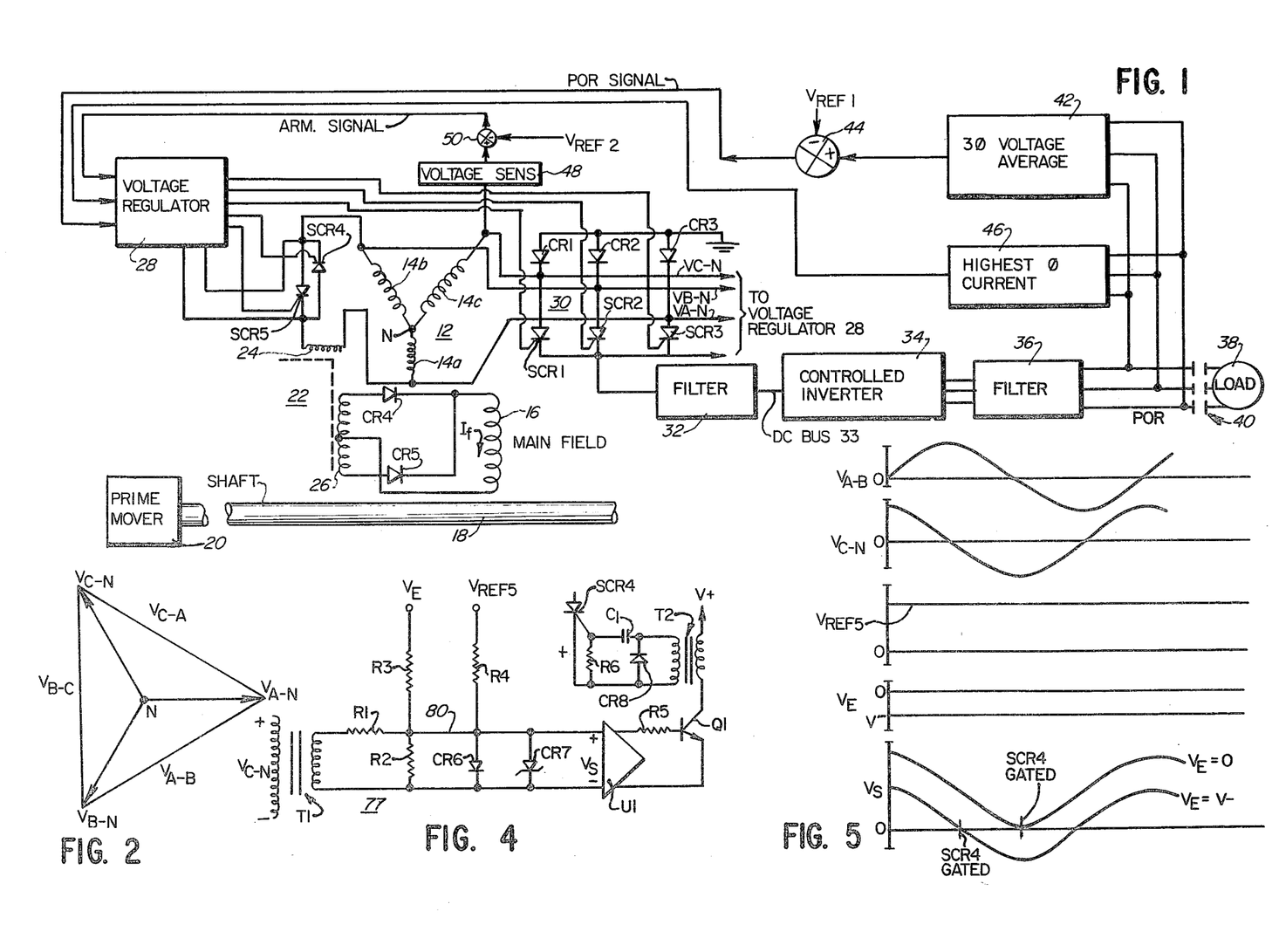
FIG. 1 is a block diagram of a generator system according to the present invention.
FIG. 2 is a vector diagram of voltages developed at the main generator armature output.
FIG. 4 is a schematic diagram of one of the cosine modulators shown in block diagram form in FIG. 3.
FIG. 5 is a series of waveform diagrams illustrating particular voltages in the circuit of FIG. 4.

Referring now to FIG. 1, a first embodiment of the generator system of the present invention includes a main generator, indicated generally at 12, having a set of stationary armature windings 14a–14c and a rotating main field winding 16 mounted on a shaft 18 driven by a source of motive power, such as prime mover 20.

Figure 6A:
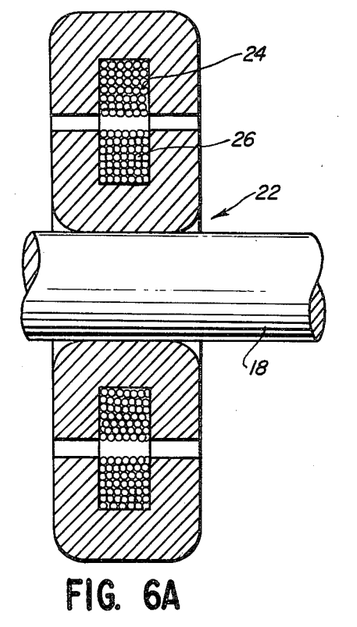
FIGS. 6A and 6B are partial sectional and end elevational views, respectively, of the rotating transformer shown schematically in FIG. 1.
Figure 6B:
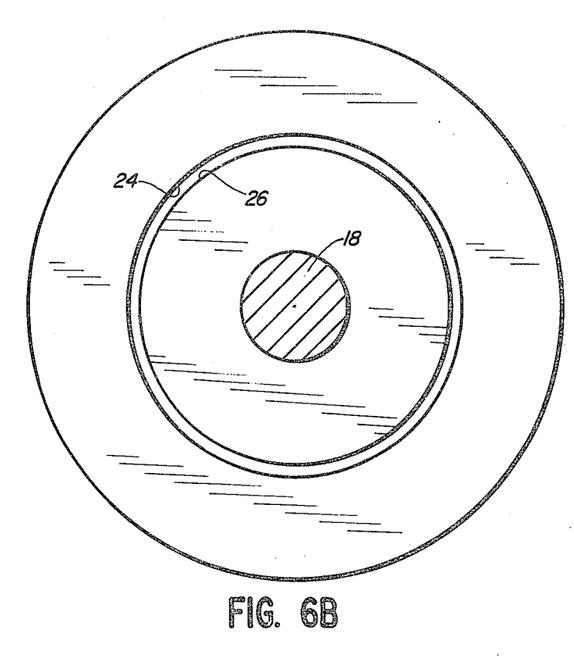

Excitation for the main field winding is provided by a rotary transformer 22, shown more particularly in FIGS. 6A and 6B, having a stationary primary winding 24 and a rotating secondary winding 26 mounted on the shaft 18. Rectification of the current developed in the secondary winding 26 is accomplished by a pair of diodes CR4 and CR5.

The primary winding 24 of the rotary transformer 22 is coupled across two of the armature windings 14a and 14b through a pair of parallel connected silicon controlled rectifiers SCR4 and SCR5. The rectifiers SCR4 and SCR5 control the current through the primary winding 24 of the rotary transformer 22 by means of control pulses delivered to the gates thereof by a voltage regulator 28 in a fashion to be described more specifically below.

The main generator armature windings 14a–14c are coupled to a full wave rectifier circuit 30 which includes three diodes CR1–CR3 and three silicon controlled rectifiers SCR1–SCR3. The firing angle of the rectifiers SCR1–SCR3 is controlled by the voltage regulator circuit 28 which develops control pulses coupled to the gates of these rectifiers.

A filter circuit 32 is coupled to the output of the full wave rectifier 30 which smooths out the voltage developed thereby to develop low ripple DC voltage on a DC bus 33. The DC bus 33 is in turn coupled to a controlled inverter circuit 34 to develop three phase AC voltage at a desired frequency which is coupled through a filter 36 and a set of breaker contacts 40 to a load 38. The contacts 40 are connected between the filter 36 and the load 38 to provide protection for the load in the event of a fault therein, such as a short circuit. The contacts 40 may comprise a thermal or electromagnetic circuit breaker, as desired.

Connected between the filter 36 and the contacts 40 is a three-phase voltage averaging circuit 42 which develops a signal representing the average of the voltages delivered to the load 38. The output signal from the averaging circuit 42 is coupled to a summing junction 44 which compares the average with a reference signal $V_{REF1}$. A POR signal is developed by the junction 44 representing the condition at the point of regulation which is located between the filter 36 and the contacts 40. The POR signal is connected to the voltage regulator 28.

Also coupled to the point of regulation is a highest phase current circuit 46 which develops an output signal representing the magnitude of the highest current of the three phases at the point of regulation. The output signal from this circuit is also coupled to the voltage regulator 28.

The gain of the feedback circuit which includes elements 42, 44, 46 is selected to be of a relatively high magnitude to decrease the amplitude of the signals coupled to the voltage regulator 28.

An additional input to the voltage regulator 28 is derived from a voltage sensing circuit 48 coupled to one of the main generator armature windings 14b to sense the voltage thereof. The signal developed by the sensing circuit 48 is compared at a summing junction 50 with a second voltage reference $V_{REF2}$ and the output from this circuit is coupled to the voltage regulator 28.

When the generator system shown in FIG. 1 is operating properly, i.e. when no fault condition exists such as a short circuit in the load 38, the voltage regulator 28 gates the rectifiers SCR1–SCR3 in the "on" condition for the full normal duration of conduction so that the SCR's function as simple rectifiers. Further, the voltage regulator 28 gates the rectifiers SCR4 and SCR5 at the proper firing angle to provide proper excitation for the main field winding 16 in response to the POR signal developed at the output of the summing junction 44.

However, when a fault condition arises, such as when a short circuit is present in the load 38, the signal developed by the three-phase voltage averaging circuit 42 tends to decrease in magnitude, in turn causing the POR signal to become less than the signal developed by the summing junction 50. Further, the presence of a short circuit in the load tends to cause the output of the highest phase current circuit 46 to rise. This sequence of events causes the voltage regulator 28 to "phase back" or retard the firing angle of the rectifiers SCR1–SCR3 to limit the current delivered to the load and to prevent the voltage at the armature windings 14 from dropping to a low level. Furthermore, the rectifiers SCR4 and SCR5 are controlled to maintain the current through the primary of the rotary transformer 22 at a proper level, in turn assuring that self-excitation of the generator continues. In this way, sufficient current will be delivered through the contacts 40 to trip this electromagnetic or thermal circuit breaker causing the contacts to open.

Figure 3:
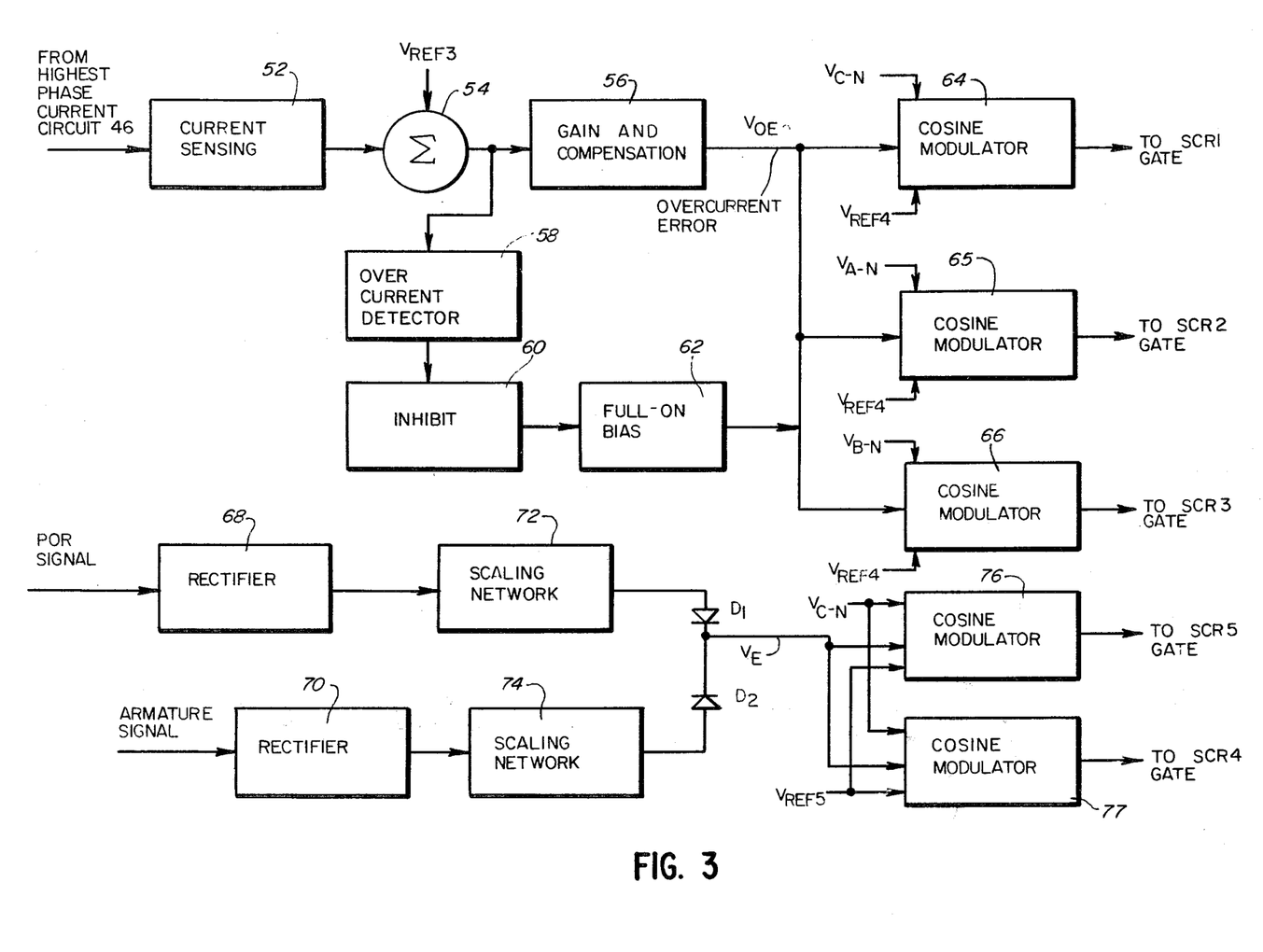
FIG. 3 is a block diagram of the voltage regulator shown in FIG. 1.

Referring now to FIG. 3, there is illustrated in block diagram form the voltage regulator 28 shown in FIG. 1. The signal from the highest phase current circuit 46 is coupled through a current sensing circuit 52 and is summed with a reference signal $V_{REF3}$ in a summing junction 54. The signal from the summing junction 54 is coupled to a gain and compensation circuit 56 and to an overcurrent detector 58.

When the system is normally operating, i.e. when no fault is present, an inhibit circuit 60, coupled to the overcurrent detector 58, is inoperative, in turn causing a full-on bias circuit 62 to provide a signal to a series of cosine modulators 64–66. The cosine modulators 64–66 are in turn coupled to the gates of the rectifiers SCR1–SCR3.

The magnitude of the signal from the full-on bias circuit 62 is selected to cause the cosine modulators 64–66 to gate the rectifiers SCR1–SCR3 approximately 30° after the zero voltage point on the respective phase voltage waveform. Each of the rectifiers SCR1–SCR3 is gated on for a full 120°, during which time the rectifier acts as a simple rectifier. The manner in which the cosine modulators 64–66 operate is described below.

The POR signal from the summing junction 44 and the armature signal from the summing junction 50 are processed by rectifier circuits 68, 70 and scaling networks 72, 74 and are connected to a diode circuit comprising diodes D1, D2. The POR signal and the armature signal are scaled relative to one another so that the POR signal is greater than the armature signal in normal operation and forward biases its associated diode D1. The POR signal therefore has sole control of the gating of the rectifiers SCR4 and SCR5 through cosine modulator circuits 76,77. The current through the primary winding 24 of the rotary transformer 22 is thereby controlled in accordance with the voltage sensed at the point of regulation.

As previously noted, the voltage at the point of regulation tends to decrease when a fault condition arises. Consequently, the magnitude of the POR signal becomes less than the magnitude of the armature signal, causing the diode D2 to be forward biased and the diode D1 to be reverse biased. The armature signal then assumes control of the rectifiers SCR4 and SCR5 through the cosine modulators 76,77.

Further, during a fault condition when the current delivered to the load increases in amplitude, the overcurrent detector 58 causes the inhibit circuit 60 to inhibit the full-on bias circuit 62. Moreover, an overcurrent error signal $V_{OE}$ is generated by the gain and compensation circuit 56 coupled to the cosine modulators 64–66. The level at which the overcurrent detector 58 causes inhibiting of the full-on bias circuit 62 is determined by the magnitude of the reference signal $V_{REF3}$ coupled to the summing junction 54. The points at which the rectifiers SCR1–SCR3 are triggered are primarily determined by the impedance of the load and fault since the feedback loop circuit gain is high.

Referring now to FIG. 4, there is illustrated a schematic diagram of the cosine modulator 64. It should be noted that, in the preferred embodiment, the circuits 64–66 and 76,77 are implemented by integrated circuits which perform the same function as the circuit shown in FIG. 4.

A signal transformer T1 receives a voltage $V_{C-N}$ developed by the winding 14c of the main generator armature. The signal level is adjusted by the transformer T1 and is applied to a summing junction 80 through a resistor R1. The summing junction 80 also receives a signal $V_E$ (either the processed POR signal or the processed armature signal) from the diode circuit through a resistor R3 and a signal $V_{REF5}$ through a resistor R4. The resistors R1, R3 and R4 must have resistances much greater than a resistor R2 to minimize interaction among the circuits. A diode C6 limits the positive level of voltage to a low level since only the negative voltage swing is of use. A zener diode CR7 limits the negative voltage swing to acceptable levels at the input of an operational amplifier U1. The operational amplifier is an integrated circuit device that has very high gain to provide an extremely sharp change in output when the input voltage to the amplifier changes from positive to negative.

The output from the operational amplifier U1 is coupled through a resistor R5 to a transistor Q1 having a collector which is coupled to a primary winding of a pulse transformer T2. The transistor Q1 boosts the current and voltage developed by the operational amplifier for proper triggering of the rectifier SCR4. The pulse transformer T2 provides isolation and level adjustment to the gate-cathode signal which floats on supply voltage V+.

The circuit shown in FIG. 4 sums a constant reference signal $V_{REF5}$ and the signal $V_E$ with a sine wave voltage that is 90° out of phase with the voltage of $V_{A-B}$ applied to the primary windings 24 of the rotary transformer 22. Referring also to the vector diagram of FIG. 2, if $V_{A-B}$ is the applied voltage, $V_{C-N}$ has a 90° phase relationship relative to $V_{A-B}$ and may be used as the input to the cosine modulator 64.

It should be noted that the cosine modulators 65,66 and 76,77 are identical to that shown in FIG. 4, with the exception of the input to the transformer T1, and the voltages $V_E$ and $V_{REF5}$. In particular, the cosine modulator 66 is identical to that shown in FIG. 4 except that the voltage $V_{C-N}$ applied to the transformer T1 is reversed in polarity from that shown in FIG. 4.

The cosine modulator 64 differs from that shown in FIG. 4 in that the voltage coupled to the resistor R3 is the overcurrent error signal $V_{OE}$ and the voltage coupled to the resistor R4 is a reference voltage $V_{REF4}$. With respect to the cosine modulator 65 a voltage $V_{A-N}$ from the winding 14a is coupled to the primary of the transformer T1 and the signals $V_{OE}$ and $V_{REF4}$ are coupled to the resistors R3 and R4, respectively. With respect to cosine modulator 66 a signal $V_{B-N}$ from the winding 14b is coupled to the primary of the transformer T1 and the signals $V_{OE}$ and $V_{REF4}$ are coupled to the resistors R3 and R4, respectively.

Referring also to FIG. 5, the rectifier SCR4 is gated into conduction when the voltage waveform $V_S$ at the input of the operational amplifier U1 drops below zero volts. The waveform $V_S$ is shown for the cases where $V_E$ is equal to zero and when $V_E$ is equal to a negative voltage $V-$. It can be seen that the trigger point for the SCR is a function of the voltage $V_E$, which is in turn developed by the POR signal or the armature signal depending upon the relative magnitudes thereof as previously noted. The points in time at which the rectifiers SCR1–SCR3 and SCR5 are gated are similarly controlled by the cosine modulators 64–66 and 76.

Figures 9A, 9B, 11:
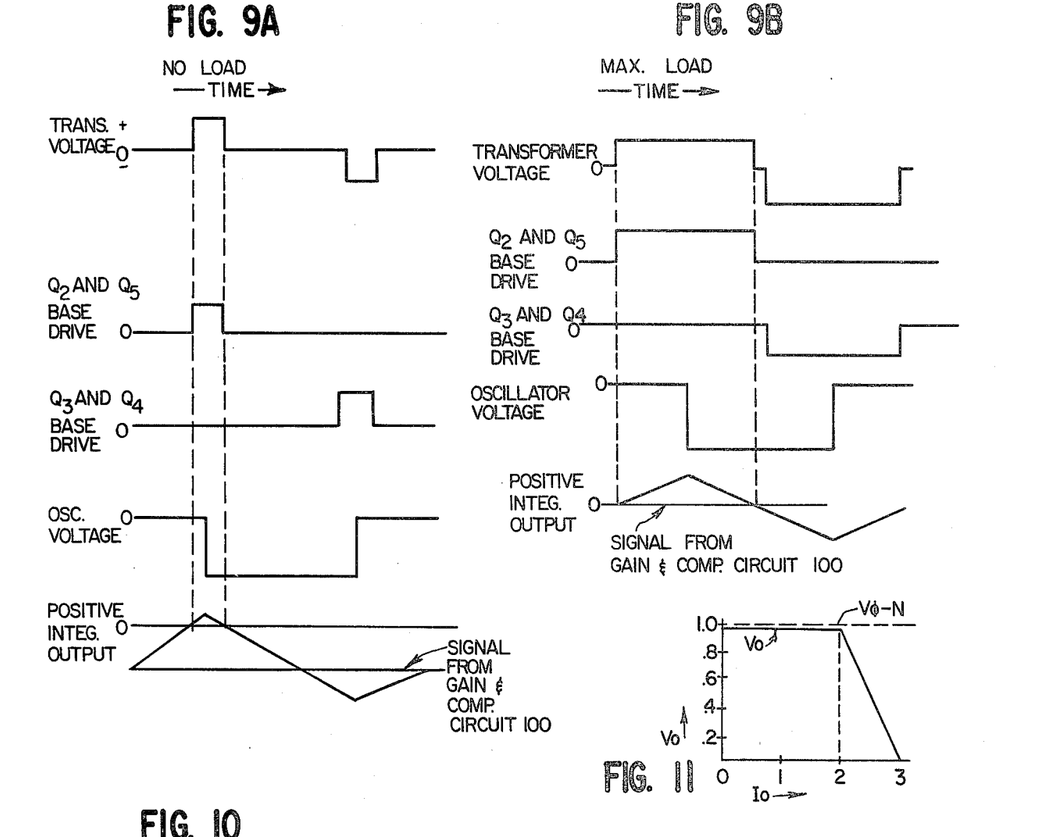
FIGS. 9a and 9b are waveform diagrams of particular voltages in the voltage regulator shown in FIG. 8.
FIG. 11 is a graph of output current versus output voltage for the generating systems of FIG. 1, 7 or 10.

Further, when a overcurrent condition arises, the load current drawn from the armature windings 14 is limited between two and three p.u. by phase control of SCR1–SCR3 as seen in FIG. 11, where p.u. stands for "per unit" with one p.u. being equal to the rated output power of the generator. Hence, during normal operation, the rectifiers SCR1–SCR3 are fully on and contribute no worse ripple than rectifiers would, but during overloads and short circuits when ripple is more tolerable, the SCR's phase control the output voltage.

Figure 7:
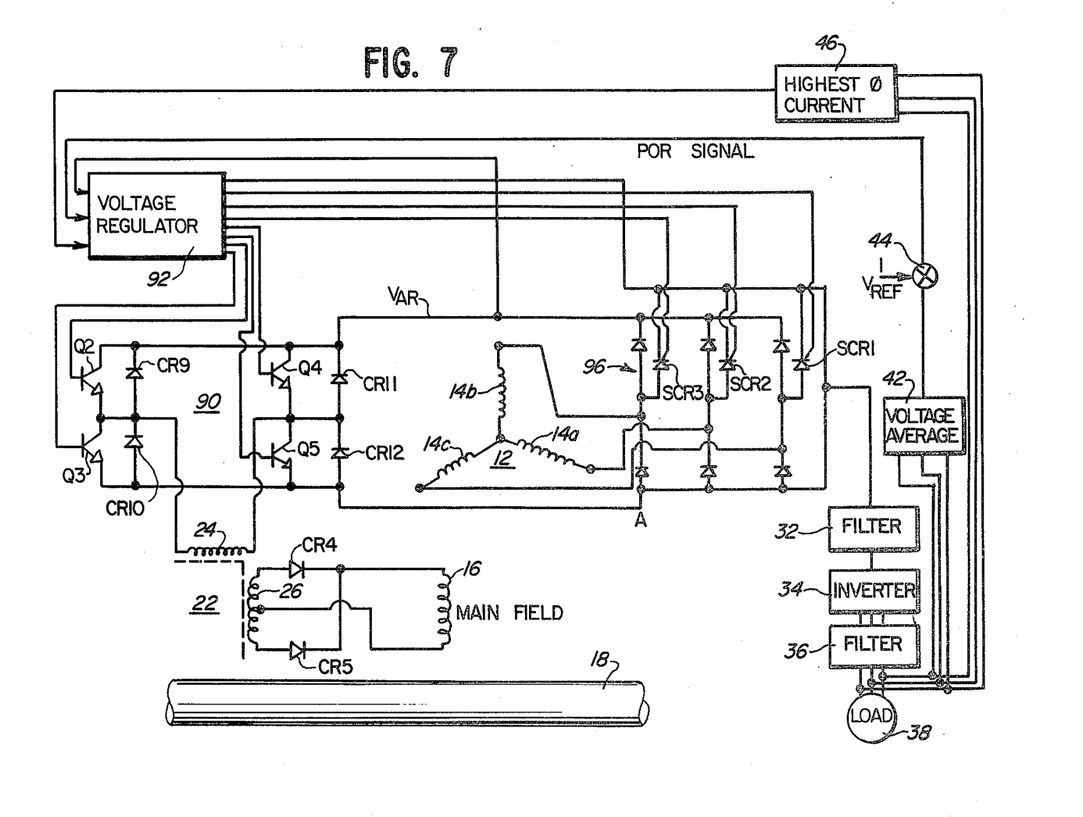
FIG. 7 is a schematic diagram of a further embodiment of the invention.
Figure 8:
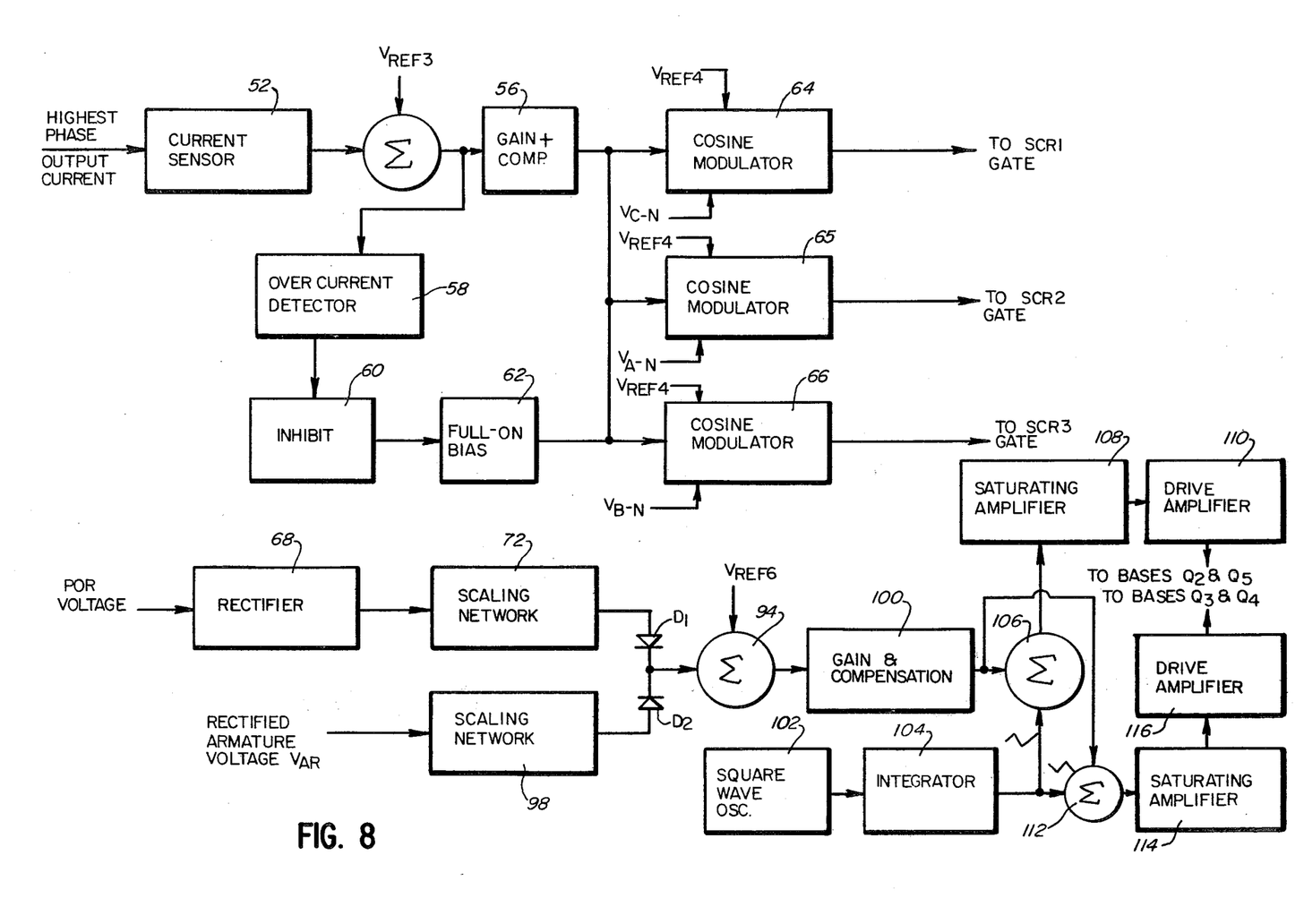
FIG. 8 is a block diagram of the voltage regulator shown in FIG. 7.

Referring now to FIGS. 7 and 8, there is illustrated a further embodiment of the present invention which utilizes a controlled inverter 90 to supply the current to the primary of the rotating transformer 22. In effect, the controlled inverter allows free choice of the frequency used for excitation, rather than being limited to the frequency of the main generator output signals, in turn permitting the rotary transformer 22 to be made smaller and lighter.

The circuit shown in FIG. 7 operates in a substantially identical manner to that shown in FIG. 1 except the means to perform generator excitation, which is described below. Common elements in FIGS. 1 and 7 are assigned the same reference numeral.

The circuit shown in FIG. 7 includes a voltage regulator 92 which is similar to the voltage regulator 28 shown in FIG. 1, and is shown in greater detail in FIG. 8.

The control for the rectifiers SCR1–SCR3 is identical to that described in connection with FIG. 3. The remainder of the circuitry shown in FIG. 8 comprises a pulse width modulator, or PWM, to control the switching of transistors Q2–Q5 connected in the controlled inverter 90 shown in FIG. 7.

The POR signal is coupled through the rectifier 68, the scaling network 72 and the diode D1 to a summing junction 94. The output from the main generator armature windings 14 are rectified by a full wave rectifier 96, shown in FIG. 7, to develop a voltage $V_{AR}$. This voltage is applied to a scaling network 98 and through the diode D2 to the summing junction 94.

A voltage reference $V_{REF6}$ is summed with the signal from the diodes D1 and D2 in summing junction 94 and the resulting signal is connected to a gain and compensation circuit 100. The output from the gain and compensation circuit is in turn summed with a sawtooth signal generated by a square wave oscillator 102 and an integrator 104 at a summing junction 106. The signal from the summing junction 106 is in turn connected to a saturating amplifier 108 and a drive amplifier 110 to provide base drive for the transistors Q2 and Q5 shown in FIG. 7.

In a similar fashion, the output from the gain and compensation circuit 100 is summed with the sawtooth signal in a summing junction 112 and is coupled through a saturating amplifier 114 and a drive amplifier 116 to provide base drive for the transistors Q3 and Q4 shown in FIG. 7.

Referring to the waveform diagrams of FIGS. 9A and 9B, it can be seen that the base drive waveforms for the transistors Q2-Q5 consist of positive pulses. The signals developed in response to the base drive waveforms are combined by the controlled inverter 90 shown in FIG. 7 to generate the voltage applied to the transformer primary.

Further, the signal from the gain and compensation circuit 100 shifts the level of the sawtooth signal developed by the square wave oscillator 102 and the integrator 104 to vary the pulse width delivered to the rotary transformer primary winding 24. As seen in FIG. 9A, the pulse width is relatively narrow, owing to the negative level shifting of the sawtooth signal due to the summing of the negative signal from the gain and compensation circuit 100 with the signal from the integrator 104.

However, as seen in FIG. 9B, under conditions of maximum load, the pulse width is increased significantly since the gain and compensation circuit 100 introduces no level shifting to the ramp signal, and hence the rotary transformer primary winding 24 receives a voltage which is nearly a square wave. It can be seen that this action causes the main field excitation to increase during fault conditions, thereby insuring continuing self-excitation.

As previously noted with respect to FIG. 1, the rectifiers SCR1-SCR3 are phased back to maintain the voltage at the output of the armature windings 14 at the levels shown in the graph of FIG. 11.

Figure 10:
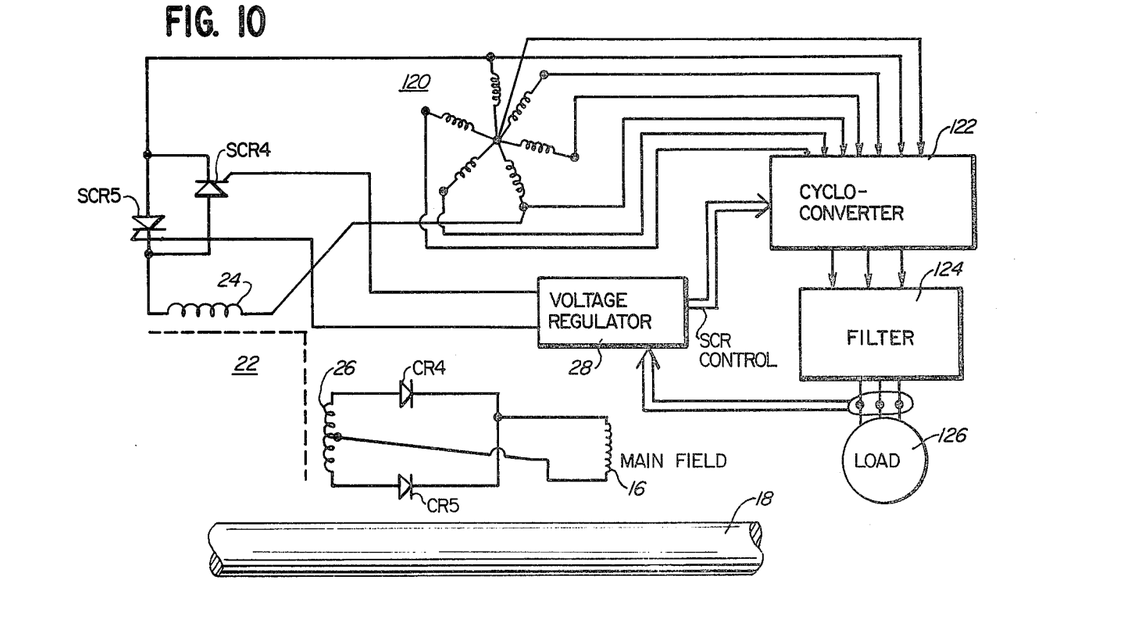
FIG. 10 is a schematic diagram of a further embodiment of the invention used in conjunction with a cycloconverter generating system.

Referring now to FIG. 10, there is illustrated a further embodiment of the invention which is utilized in conjunction with a cyclo-converter generating system. The illustrated cyclo-converter system includes a main generator 120 which develops six-phase variable frequency voltage from the magnetic field set up by a rotating main field winding 16. The winding 16 receives dc current from the secondary 26 of the rotating transformer 22.

The voltage regulator 28 shown in FIG. 3 is utilized to control the conduction of the rectifiers SCR4,SCR5 and thereby control the portion of the generator output which is coupled to the primary 24 of the rotary transformer 22.

The output from the six-phase main generator 120 is coupled to a cyclo-converter 122 which converts the six-phase variable frequency voltage into a three-phase fixed frequency voltage. This voltage is coupled to a filter 124 and to a load 126. The voltage regulator 28 may also be used to phase control SCR's located in the cyclo-converter to limit output current during fault conditions. The only difference between the voltage regulator shown in FIG. 3 and that shown in FIG. 10 would be that three additional cosine modulators must be utilized to control the gating of an SCR for each of the six phases.

I claim:

1. In a generating system driven by a source of motive power for energizing a load, including means for developing main generator field current, a rotating main generator field winding coupled to the developing means and to the source of motive power for generating a moving main generator magnetic field and a stationary main generator armature disposed in the moving main generator magnetic field for generating main generator output current, the improvement comprising:
   means for sensing the voltage at the load;
   means coupled to the load voltage sensing means for detecting when the load voltage is less than a predetermined value;
   means for sensing the voltage at the main generator armature; and
   means responsive to the detecting means and coupled to the developing means and the armature voltage sensing means for controlling the main generator field current in response to the sensed voltage at the main generator armature when the sensed voltage at the load is less than the predetermined value.

2. The improvement of claim 1, further including means for limiting the main generator output current when the sensed voltage at the load is less than the predetermined value.

3. The improvement of claim 1, wherein the controlling means controls the main generator field current in response to the sensed voltage at the load when such voltage is greater than the predetermined value.

4. The improvement of claim 1, wherein the developing means includes a rotary transformer having primary and secondary windings and wherein the controlling means includes a controlled rectifier coupled between the main generator armature and the primary winding of the rotary transformer.

5. The improvement of claim 4, wherein a cosine modulator is coupled between a gate electrode of the controlled rectifier and the detecting means to control the current delivered to the primary winding of the rotary transformer.

6. The improvement of claim 5, wherein the detecting means includes first means for summing the load voltage with a first reference signal to develop a POR signal and second means for summing the main generator armature voltage with a second reference signal to develop an armature signal.

7. The improvement of claim 6, further including first and second diodes each having an anode and cathode, the anode of the first diode being coupled to the POR signal, the anode of the second diode being coupled to the armature signal and the cathodes of the diodes being connected together and to the cosine modulator such that the consine modulator is operated in accordance with the POR or armature signal, whichever has the greater magnitude.

8. The improvement of claim 2, wherein the limiting means includes means for sensing the current delivered to the load and means for reducing such current when it exceeds a particular value.

9. The improvement of claim 8, wherein the reducing means includes a controlled rectifier coupled between the main generator armature and the load and a cosine modulator responsive to the current sensing means for controlling the controlled rectifier.

10. In a three-phase generating system driven by a source of motive power for energizing a load, including means for developing main generator field current, a rotating main generator field winding coupled to the developing means and to the source of motive power for generating a moving main generator magnetic field and a stationary main generator armature disposed in the moving main generator magnetic field for generating main generator output current, the improvement comprising:
   means for sensing the average voltage of the three-phase voltage at the load;
   means coupled to the load voltage sensing means for detecting when the average at the load is less than a predetermined value;
   means for sensing the voltage at the main generator armature; and
   means responsive to the detecting means and coupled to the developing means and the armature voltage sensing means for controlling the main generator field current in response to the average voltage at the load when such voltage is greater than the predetermined value and for controlling the main generator field current in response to the sensed voltage at the main generator armature when the average voltage at the load is less than the predetermined value.

11. The improvement of claim 10, further including means for detecting the highest phase current delivered to the load and means for limiting the main generator output current when the highest phase current is greater than a predetermined magnitude.

12. The improvement of claim 10, wherein the developing means includes a rotary tranformer having a primary winding which is coupled to the main generator armature and a secondary winding for developing the main generator field current and wherein the controlling means includes a pair of parallel connected controlled rectifiers connected between the main generator armature and the rotary transformer primary winding.

13. The improvement of claim 12, wherein the controlling means further includes cosine modulators coupled to the gate electrodes of the controlled rectifiers for controlling the current delivered to the primary winding of the rotary transformer.

14. The improvement of claim 10, wherein the controlling means further includes a pulse with modulator coupled between the main generator armature and the primary of the rotary transformer.

15. The improvement of claim 14, wherein the pulse with modulator includes a plurality of transistors and wherein the controlling means includes a plurality of cosine modulators for controlling the conduction of the transistors to control the current delivered to the primary of the rotary transformer.

16. In a three-phase generating system driven by a source of motive power for energizing a load, including means for developing main generator field current, a rotating main generator field winding coupled to the developing means and to the source of motive power for generating a moving main generator magnetic field and a set of stationary main generator armature windings disposed in the moving main generator magnetic field for generating polyphase main generator output current, the improvement comprising:
   means for sensing the average phase voltage at the load;
   means coupled to the load voltage sensing means for detecting when the average load voltage is less than a predetermined value;
   means for sensing one phase voltage at the main generator armature;
   a rotary transformer having a primary winding coupled to one phase of the main generator armature and a secondary winding coupled to the prime mover for developing the main generator field current;
   means responsive to the detecting means and coupled to the developing means and the armature voltage sensing means for controlling the current delivered to the primary winding of the rotary transformer in response to the voltage at the main generator armature when the average phase voltage at the load is less than the predetermined value and for controlling the current delivered to the primary winding of the rotary transformer in response to the average phase voltage at the load when such voltage is greater than the predetermined value;
   means for sensing the highest phase current delivered to the load; and
   means for limiting the current delivered to the load when the highest phase current is greater than a predetermined limit.

* * * * *

UNITED STATES PATENT AND TRADEMARK OFFICE
CERTIFICATE OF CORRECTION

PATENT NO. : 4,442,396
DATED : April 10, 1984
INVENTOR(S) : David J. Hucker

It is certified that error appears in the above-identified patent and that said Letters Patent is hereby corrected as shown below:

Column 9, line 23, after "average" insert --voltage--.

*Signed and Sealed this*

*Second Day of October 1984*

[SEAL]

*Attest:*

GERALD J. MOSSINGHOFF

*Attesting Officer*     *Commissioner of Patents and Trademarks*